Feb. 5, 1963    J. D. LANGDON    3,076,470
VACUUM BREAKING CHECK AND SHUT-OFF VALVE
Filed Dec. 1, 1959
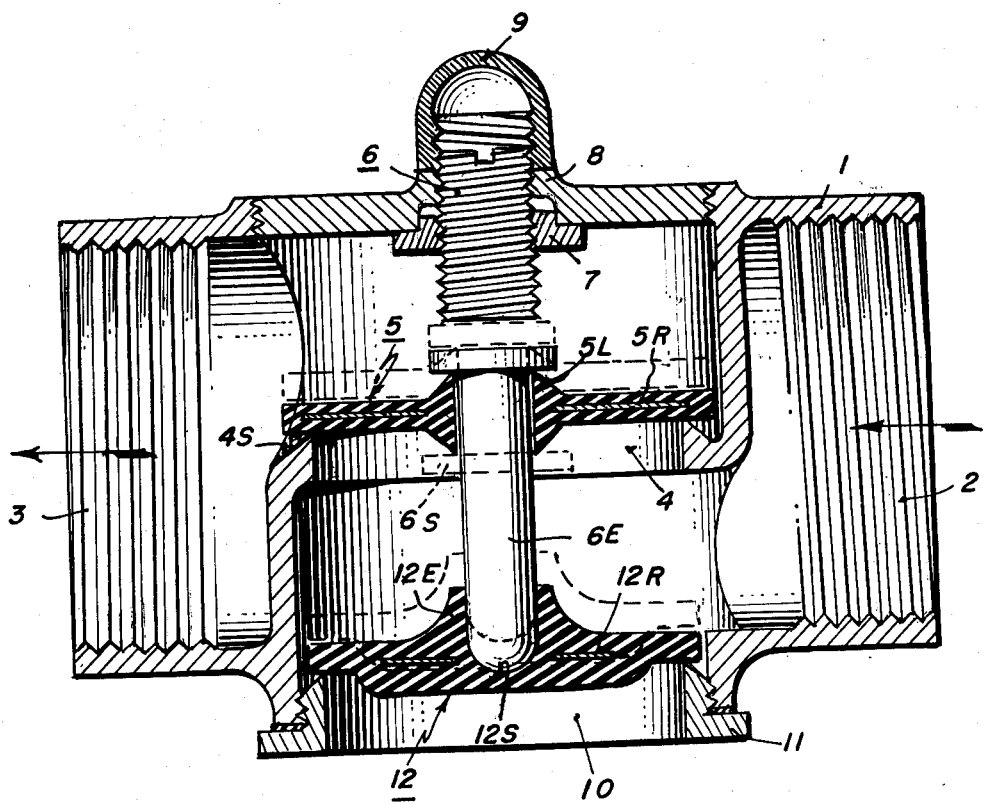
INVENTOR.
J. D. Langdon

United States Patent Office 3,076,470
Patented Feb. 5, 1963

3,076,470
VACUUM BREAKING CHECK AND SHUT-OFF VALVE
Jesse D. Langdon, 1 John St., East Rockaway, N.Y.
Filed Dec. 1, 1959, Ser. No. 856,456
2 Claims. (Cl. 137—218)

The primary object of this invention is to provide a valve casing having inlet and outlet ends and provided with an air inlet opening communicating with a liquid flow passage extending between the two ends together with valve means for simultaneously controlling the liquid flow passage and the air inlet passage, a valve stem adjustably inserted thru the top of said casing and slidably extended thru the valve controlling said liquid passage, said stem being slidably inserted into the valve means controlling the air inlet passage. The liquid control valve is a check valve at such times as the stem is in open position. When a negative pressure is exerted from the inlet end, the valve means controlling the air inlet is opened by atmospheric pressure to balance negative pressure existing at the inlet end.

Another object is to provide a combination of elements comprising a shouldered stem adjustably inserted thru the wall of a casing, and slidably thru a main valve member arranged to reciprocate on the stem beyond the shoulder, the distal end of said stem slidably disposed within a recess forming a socket in the proximate side of an air valve member closing an air port laterally disposed with respect to the inlet and outlet ends of a casing provided for the device comprising the invention.

A still further object is to arrange two valves in tandem alignment together with means whereby the open position of both valves can be manually limited. A still further object is to arrange the valve mechanism of the device so that the inlet and outlet ends are interchangeable. The reduction to practice illustrated by the drawing is diagrammatic and the form may be changed within the scope of the claims.

Of the drawing:
The FIGURE is median longitudinal section of the invention embodied by the device and shows:

A casing 1 having an inlet end 2 and an outlet end 3 with a passageway for liquid 4 communicating therebetween, provided with a valve seat 4S on that side of the passageway 4 that communicates toward the outlet end 3, a control valve member made of deformable material 5 resting on seat 4S, a threaded valve stem 6 extended upwardly thru a packing 7 made of deformable material and a bonnet 8 threadedly inserted into the top of casing 1, the stem 6 being surmounted by a cap 9 serving as a set nut adapted to hold said stem 6 in fixed position of adjustment, air inlet port means 10 communicating with passageway 4 and extending thru a seat ring 11 threadedly inserted thru the bottom of said casing 1, an air valve member made of deformable material 12 provided with metal reenforcement 12R and adapted to seat on ring 11 and close said air inlet 10, said stem 6 having a downwardly extended portion 6E slidably inserted thru valve member 5 and into a guide socket 12S recessed into the top of and adapted to align and guide the air valve 12 to closed position, the foregoing organization of elements functions as follows:

The valve member 5 is provided with lip means 5L extended from the upper face of member 5 and surrounding the stem extension 6E proximate the shoulder 6S of stem 6. A similar lip portion is shown extended from the lower face of the valve member 5, at least one of these lip portions being essential to prevent passage of pressure fluid between stem 6 and lip 5L, due to pressure effective concentrically against either of the lips. The impingement of shoulder 6S against lip 5L also serves to prevent leakage around the stem 6. A reinforcement 5R is provided to lend rigidity to member 5.

In any event, when pressure fluid exists within the casing 1, the inlet 2 of air valve member 12 is urged downwardly to its seat formed by ring 11 and closes port means 10. When the stem 6—6E is raised and a negative pressure exists in passageway 4 atmospheric pressure entering thru passage 10 is effective to raise valve 12 from its seat, permitting entry of air into passageway 4 effective to balance the pressure therein, atmospheric pressure plus the weight of valve 5 being effective against the top of valve member 5 to hold same in closed position preventing the ingress of pressure fluid from the outlet 3 thru passageway 4.

When the valve member 5 is open and a negative pressure exists within the inlet end 2, atmospheric pressure will enter the passageway 4 via passage 10 effective to open valve 12 and neutralize the pressure within the casing 1, thereby preventing the ingress of any contaminated fluid from that end of the device serving as an outlet.

Having described my invention as illustrated by the drawing, the following claims are made:

1. A device of the character described, comprising a valve casing having inlet and outlet passages, a liquid flow passage communicating between the inlet and outlet passages, a main valve seat interrupting said liquid flow passage and facing toward the outlet passage, a main valve member resting on said main valve seat, an air inlet port communicating with the inlet passage and aligned with said liquid flow passage and said main valve member, a second valve member resting on a valve seat provided on the inside of said air inlet port, a shouldered valve stem adjustably disposed thru that side of said casing that is opposite to said air inlet port, the shoulder of the stem resting on the outlet side of said main valve member, a portion of said stem depending from said shoulder and slidably extended thru said main valve member and into a recess provided on the inside of the second valve, the terminal end of said stem resting against the bottom of said recess, thereby holding both valves in closed position, the foregoing combination of elements providing means whereby the rise of both valve members is simultaneously limited and both valves are closed by adjustment of said stem.

2. A device of the character described, comprising a casing provided with intercommunicating inlet and outlet passages, an air inlet port disposed thru one side of said casing in alignment with a communicating passage extended transversely with respect to the inlet and outlet passages, a main valve member resting on a seat surrounding the transverse passage and facing toward the outlet passage, an air valve member resting on a seat provided by the inside of the air port, the inner side of said air valve member being exposed toward the inlet passage, an adjustable shouldered stem threadedly disposed thru that side of the casing that is opposite to said air port, the shoulder of the stem being proximate to and resting against the outer proximate side of said main valve member that faces toward the outlet passage, said stem provided with an extension of reduced diameter depending from the shoulder and slidably disposed to reciprocate thru said main valve member, said extension terminating and slidable to reciprocate within a socket recessed into said inner side of said air valve member, whereby, when the stem is in open position both valves being reciprocally disposed on the extension of said stem for independent movement, the shoulder and terminal end of the extension from said shoulder of said stem being arranged to contact respective valve members simultaneously when adjusted to limit the opening of both valves and urge same to respective seats.

References Cited in the file of this patent

UNITED STATES PATENTS

| | | |
|---|---|---|
| 209,975 | Morey | Nov. 19, 1878 |
| 1,295,394 | Voorhees | Feb. 25, 1919 |
| 2,447,510 | Langdon | Aug. 24, 1948 |
| 2,472,933 | Anderson | June 14, 1949 |
| 2,500,806 | Dalrymple | Mar. 14, 1950 |
| 2,730,117 | Svirsky | Jan. 10, 1956 |
| 2,881,788 | Johnson | Apr. 14, 1959 |

FOREIGN PATENTS

| | | |
|---|---|---|
| 567,681 | Italy | Oct. 15, 1957 |
| 868,218 | France | Sept. 22, 1941 |